Figure 1:
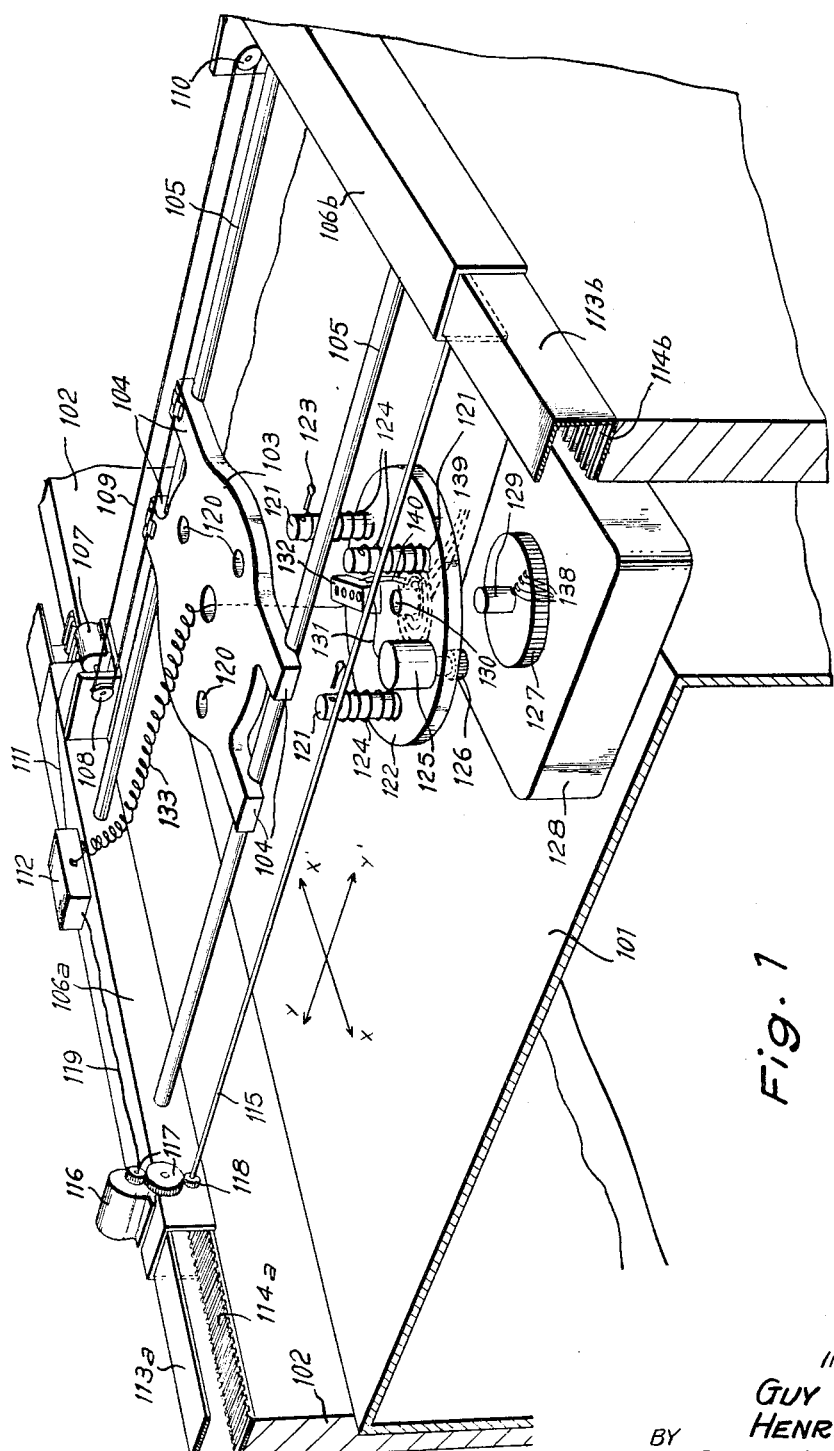

May 21, 1963 G. CHEREL ETAL 3,090,500
REMOTE-CONTROLLED MANIPULATING APPARATUS
Filed Jan. 14, 1960 2 Sheets-Sheet 1

INVENTORS
GUY CHEREL
HENRI FOREY
BY Bacon & Thomas
ATTORNEYS

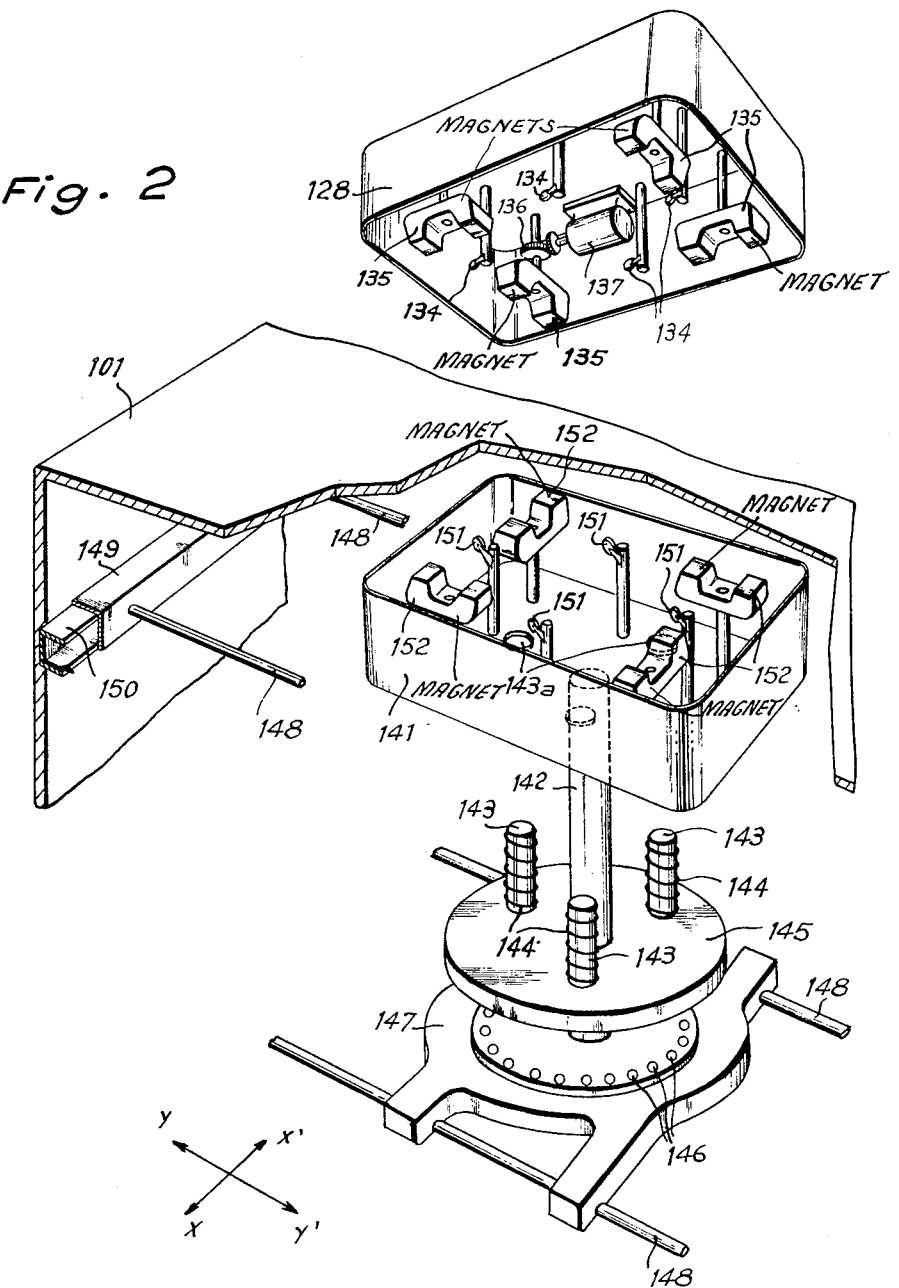

United States Patent Office 3,090,500
Patented May 21, 1963

---

3,090,500
REMOTE-CONTROLLED MANIPULATING APPARATUS
Guy Cherel, Clamart, and Henri Forey, Paris, France, assignors to Commissariat a l'Energie Atomique, Paris, France
Filed Jan. 14, 1960, Ser. No. 2,446
6 Claims. (Cl. 214—1)

In the nuclear industry, the manipulation of radioactive products has to be done from a distance, with the aid of remote-controlled manipulating apparatus, in sealed chambers in order to avoid contamination of the surrounding atmosphere by dusts or aerosols. Furthermore, when the level of radioactivity is high, these sealed chambers themselves have to be surrounded by a protective wall made of a material having a high atomic number and consisting for instance of a special concrete.

In order to permit the control members of the "telemanipulators" or remote-controlled tongs, used for manipulating objects inside these sealed chambers, to pass through, it is necessary to make openings in the walls of these chambers and these openings are provided with flexible sleeves or with sealing means of the stuffing-box type.

These sealing means or sleeves present awkward maintenance problems; they are hard to set in place and to withdraw, more particularly when they are torn and consequently contaminated. Furthermore, in most cases they restrict the zone of action of the apparatus.

In Patent No. 2,973,107, there is disclosed a telemanipulator or remote-controlled manipulating apparatus for sealed chambers which does not require the creation of openings in the walls of these chambers, and which therefore does not have the above mentioned disadvantages.

For this purpose, a "telemanipulator" comprising a first group of control units disposed outside the sealed chamber and actuating a second group of corresponding operating units disposed inside the chamber, in which the connections between the control units and the operating units of each group were effected by rotary movement transmission means of a known type comprising two rotary magnets disposed one on each side of a wall of non-magnetic material, was characterized in that the outer control magnets were actuated by rotary members capable of being displaced parallel to the non-magnetic wall bounding the sealed chamber.

In a particular embodiment, the outer control magnets were actuated by rotary shafts, and these shafts were mounted on casings or box structures provided with rolling members kept is contact with the non-magnetic wall. In the embodiment described and illustrated, the movements were transmitted, with the aid of mechanical means, from mechanical members actuated directly by an operator, to rotary shafts actuating the external control magnets.

It was stated that the main advantage of a telemanipulator of this type was that it permitted the construction of manipulation chambers that were perfectly sealed with respect to the ambient medium, since there were no openings in the walls bounding these chambers.

It was also stated that since the control units outside the chamber were not mechanically connected to the internal operating units but were merely magnetically connected to these internal units, it was very easy to disconnect these units from one another, and also to work a plurality of sealed chambers, each provided with its own internal operating units, by means of a single group of control units.

The present invention relates to improvements in the telemanipulator according to the main application, with the object of making this telemanipulator easier to handle and less bulky, and also facilitating the transfer of all of the external control units from one chamber to another.

For this purpose, an improved telemanipulator according to the present invention is characterized in that on the one hand all of the magnetic control units outside the chamber are mounted in a box half which is movable on the outside surface of the roof of the sealed chamber, and all of the controlled magnetic operating units are mounted, within the sealed chamber, in a box half which is movable against the inside surface of the roof so as to be capable of following all the displacements of the controlling external box half, and on the other hand the rotary movement of the manipulator itself, inside the chamber, about its own vertical axis is effected by the rotation of the controlling external box half producing rotation of the internal box half.

According to a preferred embodiment of the invention, the transmission of commands from the control arm actuated by the operator to the controlling external box half is effected through electric cables. The rotation of the magnets of the external box half, and the production of the movements controlling the displacement and the rotation of the external box half, are effected by means of electric motors. These electric motors are supplied with current in any suitable manner. For instance, they are controlled by the movements of the control arm actuated by the operator, each of these movements driving the slide of a potentiometer which regulates a voltage, variable in magnitude and direction, at the terminals of the corresponding motor.

This embodiment presents the advantage of simplifying the means of transmission between the control arm and the external controlling box half. This transmission means, consisting simply of an electric cable, permits transmission through the protective wall, made for instance of concrete (which wall is different from the wall of the sealed chamber), without reducing the protective effect of this wall.

An embodiment of the invention chosen by way of example is particularly described hereinafter with reference to the accompanying drawings, in which:

FIGURE 1 includes a perspective view of the apparatus used for imparting longitudinal and transverse movements, over the top of the roof of a sealed chamber, to the controlling external box half, and an exploded perspective view of the means for suspending the controlling external box half and of the apparatus used for transmitting to the manipulator inside the chamber a rotary movement about the vertical axis of the manipulator, and FIGURE 2 includes a perspective view, from below, of the controlling external box half, and an exploded perspective view, from above, of the internal operating box half and the means for supporting the latter box half.

FIGURE 1 includes a exploded perspective view of the whole of the magnetic transmission system adapted to transmit manual movements of an operator, situated outside the protective walls 102, to the interior of a sealed chamber 101. In the particular embodiment described here, manual movements of the operator are converted with the aid of potentiometers, as will be explained hereinafter, into continuous electrical voltages which are transmitted by conductors to various direct-current electric motors.

The whole of the magnetic movement-transmission apparatus has to be displaceable in the longitudinal direction XX′, and also in the transverse direction YY′, on the continuous roof of the sealed chamber 101. For this purpose, the apparatus is mounted on a carriage 103 supported by two spaced transverse bars 105 through the intermediary of extensions 104. Rolling bearings not shown in the drawing are interposed between the support surfaces of the extensions 104 and the corresponding surfaces of the bars 105. The ends of the bars 105 are mounted on two longitudinal carriages 106a and 106b one on each side of the sealed chamber 101. An electric motor 107, adapted to rotate a driving pulley 108, is mounted at one end of the carriage 106a. An endless cable 109, passing around the groove of the pulley 108 on the carriage 106a, extends around the groove of another pulley 110 freely rotatably mounted on the carriage 106b. The lower run of the cable 109 is secured to the two extensions 104 of the carriage 103 which are disposed immediately below this run. Under these circumstances, it is clear that when the electric motor 107 is run in either direction the carriage 103 is driven in the corresponding sense in the transverse direction YY'. The electric motor 107 is supplied with current by an electric cable 111 connected to an electrical junction box 112 carried by the carriage 106a.

Displacement of the carriage 103 in the longitudinal direction XX' is effected by longitudinal displacement of the unit comprising the two carriages 106a and 106b interconnected by the rigid transverse bars 105. It is to be observed that the carriages 106a and 106b are downwardly open square channel members. These carriages can be displaced longitudinally, rolling on the top surface of beams 113a and 113b through the intermediary of rolling bearings not shown in the drawing. The beams 113a and 113b are supported by the protective walls 102 and are square channel members open towards the right and towards the left respectively. Two racks 114a and 114b are secured to the internal bottom surfaces of the two profiled beams 113a and 113b. These two racks mesh with two pinions, not shown in the drawings, which are fixed against rotation on the ends of a coupling bar 115. The coupling bar 115 is adapted to be driven in rotation by an electric motor 116 mounted on the carriage 106a by which a pinion 118 keyed to the coupling bar 115 is driven through the intermediary of gears 117. Under these circumstances it is clear that by running the motor 116, which is supplied with current from the junction box 112 by an electric cable 119, in either direction, it is possible to drive the carriage 103 in a similar sense in the longitudinal direction XX'.

The elements of the movement control apparatus which are disposed above the roof of the sealed chamber 101 will now be described with reference to FIGURE 1.

The carriage 103, of which the central part is of circular shape, is provided with three bores 120 spaced at intervals of 120° on the circumference of a circle. These bores 120 are adapted to accommodate three bars 121 rigid with an intermediate plate 122. When the bars have passed through the carriage 103, retaining pins such as 123 are set in place. Three helical compression springs 124 disposed around and guided by the bars 121 are interposed between the plate 122 and the lower surface of the carriage 103.

The plate 122 carries on its top surface an electric motor 125 of which the output shaft extends through the thickness of the plate 122 to a driving pinion 126. This pinion 126 meshes with a toothed crown wheel 127 secured to an external box half 128. The external box half 128 is provided with a central shaft 129 accommodated and guided in a corresponding aperture 130 in the plate 122. Rolling bearings not shown in the drawings are interposed between the bottom surface of the plate 122 and the flank of the toothed crown wheel 127 constituting the top surface of the box half 128, so as to permit rotation without friction between the box half 128 and the bottom surface of the plate 122. The electric motor 125 is supplied with current by a conductor 131 connected to an electrical junction box 132. The two electrical junction boxes 112 and 132 are interconnected by an extensible electric cable 133 containing the various electrical conductors supplying current to the electric motor 125 and to other electric motors referred to hereinafter.

Under these circumstances it is clear that when the electric motor 125, when running in either direction, rotates the external box half 128 in the opposite direction.

The top part of FIGURE 2, which is a perspective view of the external box half 128 seen from below, shows that this box half is provided with castor-action rollers 134 adapted to roll on the top surface of the roof of the sealed chamber 101.

It will now be clear that by means of the compression springs 124 the external magnetic transmission box half 128 is always kept in contact with the roof of the chamber 101 in spite of any irregularities on this roof or any bending to which the transverse bars 105 may be subjected.

A plurality of magnets 135 inside the box half 128 are mounted for rotation about vertical axes. Each of these magnets is secured for rotation with a respective pinion 136, only one of which is shown in the drawing. Each of these pinions 136 is adapted to be driven by a corresponding pinion keyed to the output shaft of a respective one of a plurality of electric motors 137, only one of which is shown in the drawing. These electric motors 137 are supplied with electric current by electric conductors whose ends are connected, as shown in FIGURE 1, to resilient contact terminals 138 disposed radially outwards from the shaft 129; these contact terminals slide against circular contact rings 139 provided on the bottom surface of the plate 122. Each of these contact rings 139 is connected to the electrical junction box 132, through the intermediary of corresponding conductors 140.

Under these circumstances, it is clear that by suitably supplying current to the electric motors 137 it is possible to rotate any one of the magnets 135 in a required direction. It is of course also clear that the poles of the magnets 135 are kept at a very small distance above the roof 101 of the sealed chamber which is made of a non-magnetic material.

We refer now to the lower part of FIGURE 2 which shows all of the magnetic controls actuated by means of the movement transmission apparatus. This part of FIGURE 2 comprises an exploded perspective view, from above, of a box half 141 adapted to be located inside the sealed chamber 101 against the bottom surface of the roof of this chamber. A cylindrical support 142 for the tongs of a telemanipulator is fixed to the bottom wall of the box half 141 which is resiliently mounted on an intermediate plate 145 by means of bars 143 passing through corresponding bores 143a provided in the bottom of the box half 141, and compression springs 144. This plate 145 is itself rotatably mounted, by means of ball bearings 146, on a carriage 147. The carriage 147 can be moved transversely, in the direction YY', on two spaced bars 148. For this purpose, rolling bearings not shown in the drawing are interposed between the carriage 147 and the bars 148.

In order to permit longitudinal displacement of the carriage 147 in the direction XX', the ends of the bars 148 are fixed to two carriages such as the carriage 149 shown in the left-hand side of the drawing; these carriages are adapted to be displaced along two rolling tracks, such as the rolling track 150, which are fixed to the vertical side walls of the sealed chamber 101.

Castor-action rollers 151 are mounted inside the box half 141 and are adapted to roll against the bottom surface of the roof of the sealed chamber 101. Four magnets 152 are so mounted on the box half 141 as to be capable of rotating freely about vertical axes. Under the action of the compression springs 144 the rollers 151 are always kept in contact with the lower surface of the roof of the chamber, in spite of any irregularities on this roof and any bending to which the transverse bars 148 may be subjected. The various elements are so adjusted that the poles of the magnets 152 are immediately adjacent to the bottom surface of the roof of the sealed chamber, the clearance between the poles and the roof being very small.

When the controlling external box half 128 of the movement transmission apparatus is placed so as to register exactly with an operating internal box half 141, the non-magnetic wall of the sealed chamber 101 being interposed between these two box halves, it is clear that the rotary movements of the magnets 152 are compelled to follow those of the corresponding magnets 135, by magnetic coupling through the non-magnetic wall of the sealed chamber.

The magnets 152 rotate wheels, pinions or any other suitable means by which it is possible in any known manner to effect upward or downward movement of the tongs of a manipulator, or the opening of the jaws of the tongs, or any operation whatsoever that is capable of being performed by the tongs of a telemanipulator. There is no need to describe in detail the manner in which these different operations are performed, because this is outside the scope of the present invention.

From the foregoing, it is thus clear that translational movements of the manipulator, of which only the suspension cylinder 142 is shown in the drawing, in the longitudinal direction XX′ or in the transverse direction YY′ are produced by general displacement of all of the magnets 135 causing all the magnets 152 to move correspondingly. Similarly, rotation of all of the magnets 135, carried by the external box half 128, about the shaft 129, causes rotation of the internal box half 141 carrying all of the magnets 152. Rotary movements of the tongs about a vertical axis are produced in this way.

In general, all the movements of the tongs are controlled by electric motors. For instance, electric motors supplied with direct current are used. The various control movements performed by an operator are converted in a known manner by the displacement of movable arms of potentiometers connected to the electrical junction box 112 by appropriate conductors. The magnitude of each displacement of the movable arms of the potentiometers in either direction corresponds to a higher or lower speed, in the corresponding direction, of the motor controlling the movement in question.

What we claim is:

1. In or for a closed chamber having a roof made of a non-magnetic material, an operating means for a manipulative means operating in the chamber comprising: a first box half movably mounted on the outside surface of the said roof; a plurality of control means rotatably mounted inside the said first box half; a second box half movably mounted inside said chamber adjacent the roof thereof in proximity to said first box half for magnetic cooperation therewith; a plurality of operating means rotatably mounted inside the said second box half; and aligned first and second magnet means provided on each of said control means and on each of said operating means respectively, establishing a plurality of magnetic couplings through the roof of the chamber between said control means and said operating means, rotary movement of each of said control means producing through said magnetic coupling corresponding rotary movement of said aligned operating means for actuating a plurality of devices of a manipulative means housed within said chamber.

2. An operating means for a manipulative means according to claim 1, wherein said first and said second box halves are mounted for rotary movement, rotation of said first box half producing through said magnetic couplings corresponding rotation of said second box half whereby rotary movement of the manipulative means adapted to be carried by the said second box half is effected.

3. An operating means for a manipulative means according to claim 2 wherein said first and second box halves are mounted for linear displacement, including first electric motor means for rotating the said first box half; second electric motor means for linear displacement of said first box half; third electric motor means for rotating said plurality of control means, rotation and linear displacement of said first box half producing corresponding rotation and linear displacement of said second box half through said magnetic couplings; and means to selectively energize said first, second and third electric motor means to selectively rotate and displace said first box half and to rotate said control means.

4. An operating means for manipulative means operating within a sealed chamber having a non-magnetic roof, comprising: a first box half located outside the chamber adjacent the roof thereof; a plurality of control means mounted inside the said first box half; a second box half located inside the chamber adjacent the roof thereof in alignment with said first box half; means mounting said box halves for simultaneous rotary movement and for simultaneous linear movement along X—X′ and Y—Y′ axes; a plurality of operating means mounted inside the said second box half; and aligned first and second magnet means provided on said control means and on said operating means, respectively, establishing a plurality of magnetic couplings between said control and operating means through the roof of said chamber, rotary and linear movement of said first box half producing corresponding movement of said second box half through said magnetic couplings for operating the manipulative means adapted to be supported by said second box half.

5. An operating means for a manipulative means operating within a sealed chamber having a non-magnetic roof, comprising: a first housing mounted outside said chamber adjacent the roof thereof; a second housing mounted inside said chamber adjacent the roof thereof in alignment with said first housing; means mounting said first and second housings for simultaneous rotary movement about centrally disposed and aligned axes and for simultaneous linear movement along X—X′ and Y—Y′ axes; a plurality of control means rotatably mounted on parallel axes within said first housing; a plurality of operating means rotatably mounted on parallel axes within said second housing, each of said operating means being disposed in axial alignment with one of said cooperating control means, said axes of rotation of said control means and of said operating means being mounted parallel with and offset relative to said axes of rotation of said housings; first magnet means fixedly mounted on each of said plurality of control means; second magnet means fixedly mounted on each of said plurality of operating means for magnetic cooperation with said first magnet means establishing a plurality of magnetic couplings through the roof of said chamber, rotary and linear movement of said first housing producing corresponding rotary and linear movement of said second housing through said magnetic couplings and rotary movement of said control means producing corresponding rotary movement of said operating means for operating the manipulative means adapted to be supported by said second housing.

6. An operating means for a manipulative means according to claim 5, wherein first electrically actuated means are provided for rotating said first housing, and second electrically actuated means are provided for rotating said control means.

References Cited in the file of this patent
UNITED STATES PATENTS 2,159,657    Fusca  ---------------- May 23, 1939
2,973,107    Cherel  --------------- Feb. 28, 1961